US011326564B2

(12) United States Patent
Nork et al.

(10) Patent No.: US 11,326,564 B2
(45) Date of Patent: May 10, 2022

(54) INTERNAL COMBUSTION ENGINES WITH EXTERNAL MIXTURE FORMATION AND COMPENSATION VESSEL FOR AVOIDING RE-IGNITION

(71) Applicant: DEUTZ Aktiengesellschaft, Cologne (DE)

(72) Inventors: Benedikt Nork, Cologne (DE); Klaus-Peter Bark, Duerrholz (DE); Peter Kipke, Olpe (DE)

(73) Assignee: Deutz Aktiengesellschaft, Cologne (DE)

( * ) Notice: Subject to any disclaimer, the term of this patent is extended or adjusted under 35 U.S.C. 154(b) by 58 days.

(21) Appl. No.: 16/609,560

(22) PCT Filed: Apr. 16, 2018

(86) PCT No.: PCT/EP2018/000205
§ 371 (c)(1),
(2) Date: Oct. 30, 2019

(87) PCT Pub. No.: WO2018/210443
PCT Pub. Date: Nov. 22, 2018

(65) Prior Publication Data
US 2020/0141371 A1    May 7, 2020

(30) Foreign Application Priority Data
May 19, 2017   (DE) .......................... 102017004858.4

(51) Int. Cl.
*F02M 35/10*   (2006.01)
*F02M 35/112*   (2006.01)
(Continued)

(52) U.S. Cl.
CPC .... *F02M 35/10275* (2013.01); *F02M 35/112* (2013.01); *F02B 27/0268* (2013.01);
(Continued)

(58) Field of Classification Search
CPC ........... F02M 35/10275; F02M 35/112; F02M 21/04; F02M 35/10216; F02M 35/10222; F02B 27/0268; Y02T 10/30
See application file for complete search history.

(56) References Cited

U.S. PATENT DOCUMENTS 2,690,331 A    9/1954  Weldy et al.
4,375,204 A *  3/1983  Yamamoto ........... F02M 35/021
                                                   123/494
(Continued)

FOREIGN PATENT DOCUMENTS

CN    204961122 U    1/2016
DE    2526550 A1    12/1976
(Continued)

OTHER PUBLICATIONS

ISR of PCT/EP2018/000205, dated Jul. 27, 2018.

*Primary Examiner* — Jacob M Amick
*Assistant Examiner* — Charles J Brauch
(74) *Attorney, Agent, or Firm* — Davidson, Davidson & Kappel, LLC

(57) ABSTRACT

Internal combustion engines having an external mixture formation and compensation tank for avoiding reignition. An internal combustion engine is provided having an external mixture formation including at least one exhaust system, at least one intake system, the intake system including at least one intake manifold, at least one throttle valve, at least one mixture forming device, at least one compensation tank, and at least one air filter.

16 Claims, 6 Drawing Sheets

(51) Int. Cl.
*F02B 27/02* (2006.01)
*F02M 21/04* (2006.01)

(52) U.S. Cl.
CPC ....... *F02M 21/04* (2013.01); *F02M 35/10216* (2013.01); *F02M 35/10222* (2013.01)

(56) References Cited

U.S. PATENT DOCUMENTS

| | | | |
|---|---|---|---|
| 4,565,166 A | | 1/1986 | Takeda |
| 5,452,737 A | | 9/1995 | Jones et al. |
| 2006/0005808 A1 | | 1/2006 | Blomenberg et al. |
| 2007/0163532 A1 | * | 7/2007 | Harada ............ F02M 35/10065 123/184.47 |
| 2007/0255483 A1 | * | 11/2007 | Tanaka ................ F02D 35/0023 701/101 |
| 2008/0178829 A1 | * | 7/2008 | Ochiai .................... F01M 9/10 123/90.27 |
| 2009/0205620 A1 | | 8/2009 | Enke |

FOREIGN PATENT DOCUMENTS

| | | | |
|---|---|---|---|
| DE | 3426307 | C2 | 4/1985 |
| DE | 10145195 | B4 | 10/2005 |
| DE | 102004037971 | A1 | 2/2006 |
| EP | 0715684 | B1 | 3/1999 |
| EP | 1647684 | A2 | 4/2006 |
| EP | 1971763 | B1 | 9/2008 |
| EP | 2054589 | B1 | 5/2009 |
| JP | S5614915 | A | 2/1981 |
| JP | S57181964 | A | 11/1982 |
| JP | 06241090 | A * | 8/1994 |
| JP | H08254162 | A | 10/1996 |
| JP | 2003106222 | A | 4/2003 |
| JP | 2015081529 | A | 4/2015 |
| KR | 20010108884 | A | 12/2001 |
| KR | 20020041902 | A | 6/2002 |
| WO | WO 9966189 | A1 | 12/1999 |
| WO | WO2007077049 | A1 | 7/2007 |

* cited by examiner

Intake manifold ignition test

| in air filter | pressure maximum | temp. maximum |
|---|---|---|
| air filter 1 without compensation tank | 3.0 bar | 70°C |
| air filter 1 with compensation tank (5 l) | 1.8 bar | 35°C |
| air filter 2 without compensation tank | 3.0 bar | 100°C |
| air filter 2 with compensation tank (5 l) | 2.0 bar | 40°C |
| air filter 3 without compensation tank | 3.0 bar | 115°C |
| air filter 3 with compensation tank (5 l) | 2.2 bar | 65°C |

Fig. 6

INTERNAL COMBUSTION ENGINES WITH EXTERNAL MIXTURE FORMATION AND COMPENSATION VESSEL FOR AVOIDING RE-IGNITION

In the case of internal combustion engines with external mixture formation, a flammable air/fuel mixture is generated upstream from the inlet valves. During this process, an undesirable combustion may take place in the intake manifold of the engine (backfire). The larger the intake manifold and the larger the mass of ignitable mixture is upstream from the inlet valves, the greater is the risk of damage.

BACKGROUND

Reignition preventing devices of this type are known from KR 20010108884 A, in which a valve plate held by internally situated coil springs is to provide a potential pressure compensation.

Furthermore, reignition preventing devices of this type are also known from KR 20020041902 A, in which externally situated coil springs are to provide a potential pressure compensation by sealing the air filter housing cover against the air filter bottom.

It is known from US 20060005808 A1 that reignition is to be prevented with the aid of a throttle valve.

EP 1971763 B1 provides a pressure sensor for ascertaining a reignition and subsequently activating a throttle valve for the purpose of pressure reduction.

In DE 2526550 A1, a subsidiary outlet is shown that is to prevent pressure increases in the case of reignitions.

JP 57181964 A provides the use of a metal mesh to cool the reignition.

WO 9966189 A1 provides a cover in the intake system of an internal combustion engine having a predetermined breaking point for the case of reignition.

EP 715684 B1 provides a smaller intake system to avoid reignitions.

EP 2054589 B1 provides a pressure control valve for avoiding reignitions.

EP 1647684 A2 provides fluidic approaches in a hydrogen-powered internal combustion engine to avoid reignitions.

DE 10145195 B4 provides a flow rectifier that is situated in an intake duct.

The subsequent injection of air into the intake system is to reduce the risk of a reignition according to DE 102004037971 A1.

The disadvantage here is that in the case of the above-named suggestions huge constructive efforts are made to minimize the reignitions or their effects.

SUMMARY OF THE INVENTION

It is an object of the present invention to provide a device and a method that avoid the above-named disadvantages and that cost-effectively and reliably protect the intake line against damage.

An internal combustion engine is provided having an external mixture formation including at least one exhaust system, at least one intake system, the intake system including at least one intake manifold, at least one throttle valve, at least one mixture forming device, at least one compensation tank, and at least one air filter. A method for operating such an internal combustion engine is also provided. The advantage here is that reignitions and their effects cannot enter the air filter.

One advantageous refinement provides that the throttle valve is situated between the intake manifold and the mixture formation device.

Another advantageous refinement provides that the mixture formation device is designed as a gas mixer.

Another advantageous refinement provides that the mixture formation device is designed as a carburetor.

It is furthermore advantageously provided that the compensation tank is designed in a step-shaped manner.

One advantageous refinement provides that the ratio of the inlet of the compensation tank to the outlet is approximately 58/80.

Another advantageous refinement provides that the mixture formation device and the compensation tank are connected with the aid of a flexible tube element.

Another advantageous refinement provides that at least one flow rectifier is situated between the compensation tank and the mixture formation device.

By installing a compensation tank, i.e., an air volume between the air filter and the mixture forming system (carburetor, air/fuel mixer), the damaging effect of the backfire may be significantly reduced. The hot combustion gases expanding against the usual flow direction as a result of the combustion (backfire/reignition) are mixed with non-combustible fresh air and cooled in the compensation tank and the backfire pressure wave is relieved.

As a result of a skilled inner design, this compensation tank may result in the pressure wave reflecting from the tank walls, thus further reducing the pressure wave and the propagation of the hot combustion gases.

To further reduce the damaging effect of a backfire (reignition), a flow rectifier may be installed. This flow rectifier includes a multiple or less dense metal lattice or net. This close-meshed lattice is installed into the intake system in the flow direction upstream from the mixture forming system. In the case of a backfire, the flame propagating against the normal flow direction must pass by the flow rectifier. The flame is significantly cooled down by the close-meshed metal lattice. Damage to the air conducting system is thus avoided.

Another advantage of the combination, made up of a compensation tank and a flow rectifier, illustrated here, is its reducing effect on gas pulsations in the intake manifold. Each valve controlled reciprocating piston engine generates pulsations in the intake manifold. These pulsations may potentially have a negative effect on the mixture formation. The compensation tank alone significantly reduces the amplitude of the pressure pulses. When the compensation tank is used in combination with a flow rectifier, these pressure pulses are further reduced. An improved mixture formation may thus take place. The engine power and torque may be increased, while at the same time harmful exhaust gas emissions are reduced.

BRIEF DESCRIPTION OF THE DRAWINGS

The present invention is explained in greater detail below on the basis of exemplary embodiments illustrated in the drawings.

FIG. 6 shows a comparison in tabular form with and without a compensation tank.

DETAILED DESCRIPTION

Figure 1:
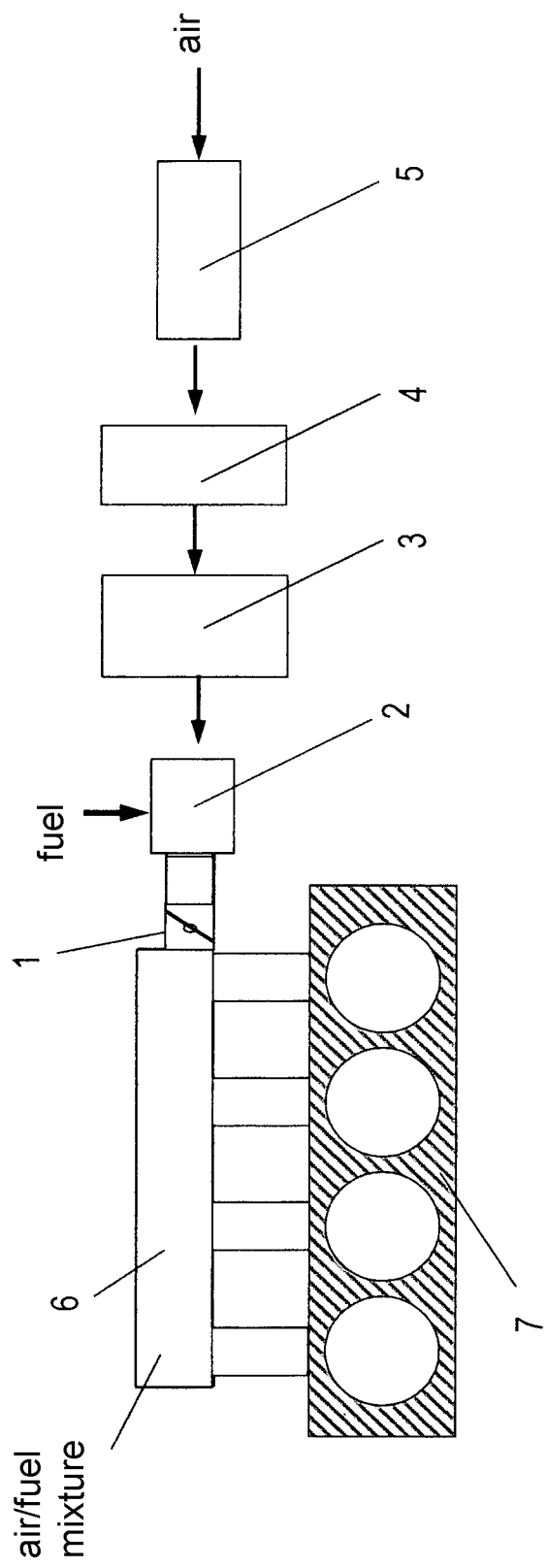
FIG. 1 shows an internal combustion engine including a flow rectifier and a compensation tank upstream from the carburetor.
Figure 3:
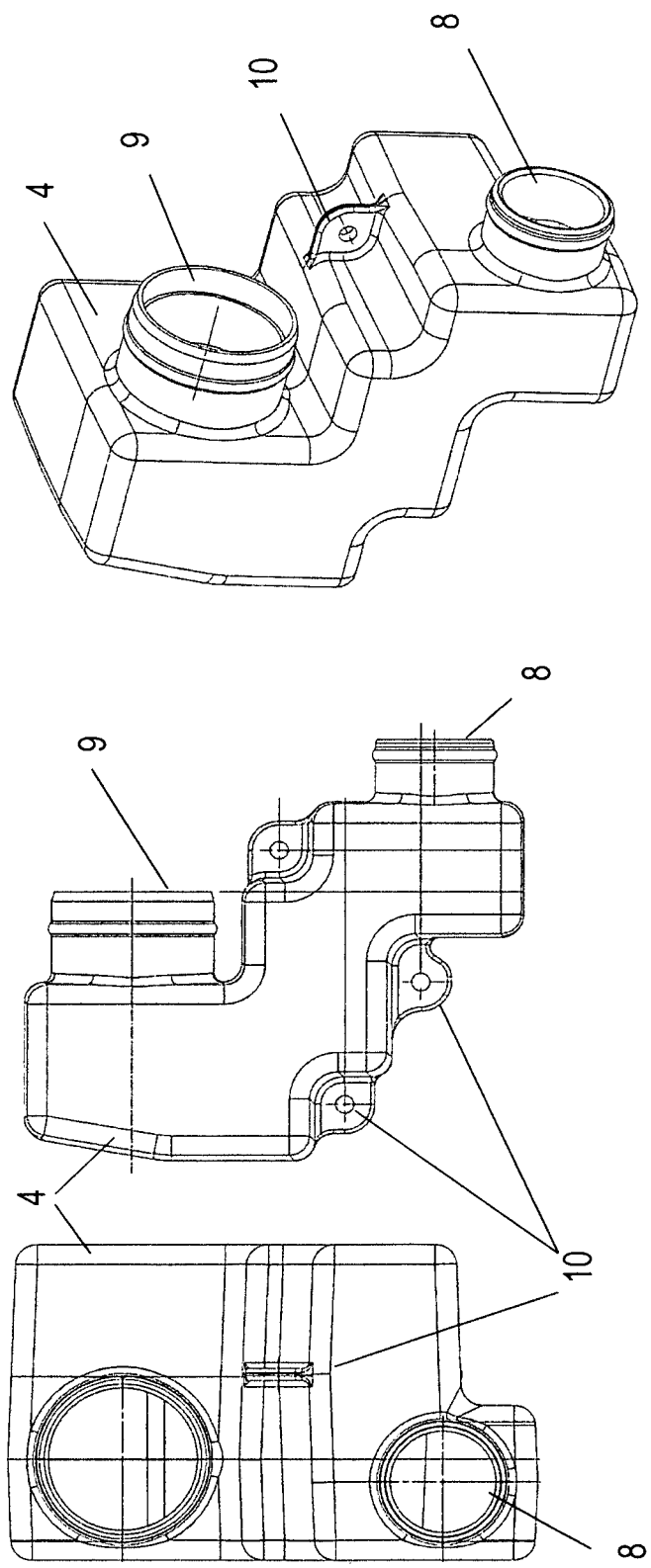
FIG. 3 shows a step-shaped compensation tank.

In FIG. 1, an internal combustion engine 7 is illustrated including a flow rectifier 3 and a compensation tank 4 that are situated in the flow direction upstream from carburetor 2. The intake air aspirated by internal combustion engine 7 passes by air filter 5 to then enter compensation tank 4 designed in a step-shaped manner via compensation tank inlet 8 (FIG. 3). The intake air present in compensation tank 4 enters flow rectifier 3 via compensation tank outlet 9 (FIG. 3), whose diameter is larger than that of compensation tank inlet 8. Flow rectifier 3 includes a flow rectifier housing and a flow rectifier insert. The flow rectifier insert is a close-meshed metal lattice. In one alternative specific embodiment, the flow rectifier insert is a comb-like extruded profile. The flow rectifier insert is preferably made of a thermally conductive metal, such as copper or aluminum.

Figure 2:
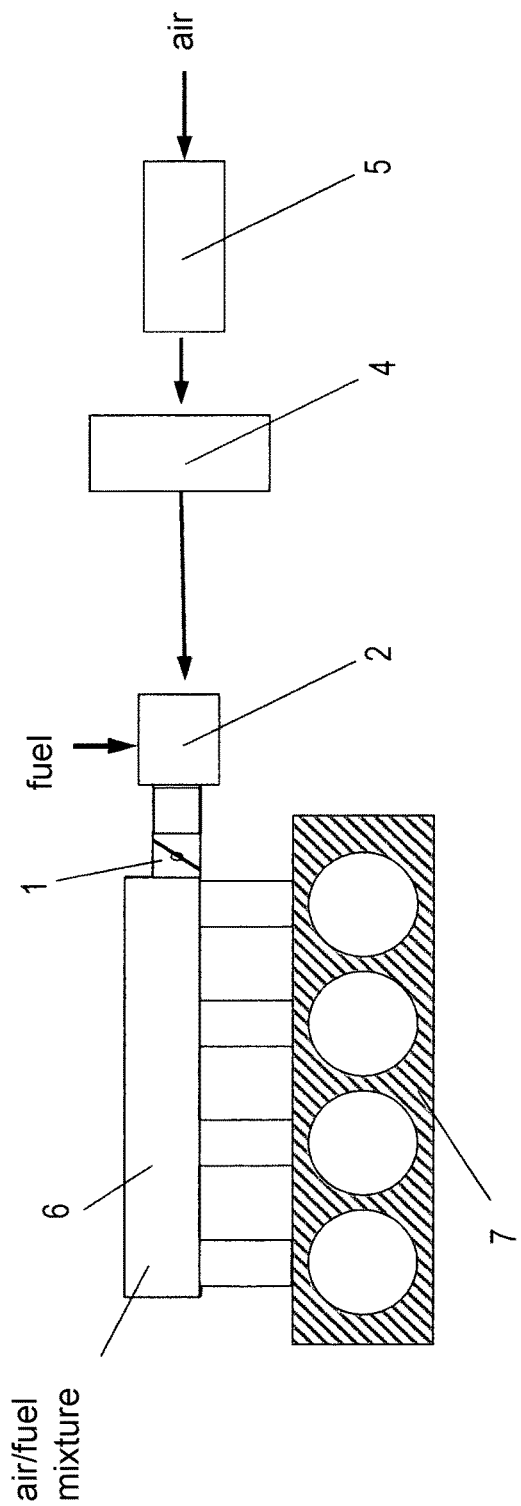
FIG. 2 shows an internal combustion engine including a compensation tank upstream from the carburetor.

FIG. 2 shows an internal combustion engine 7 including a compensation tank 4 that is situated in the flow direction of the intake air upstream from carburetor 2. The intake air aspirated by internal combustion engine 7 passes by air filter 5 to then enter compensation tank 4 designed in a step-shaped manner via compensation tank inlet 8 (FIG. 3). The intake air present in compensation tank 4 enters carburetor 2 via compensation tank outlet 9 (FIG. 3), whose diameter is larger than that of compensation tank.

In FIG. 3, a step-shaped compensation tank 4 in the form of an air intake box is provided. Compensation tank 4 includes a compensation tank inlet 8 and a compensation tank outlet 9. The outer surface of compensation tank 4 has a step-like design between compensation tank inlet 8 and compensation tank outlet 9, a fastening area 10 for fastening compensation tank 4 to the internal combustion engine being provided in the first step from compensation tank inlet 8 in the direction of compensation tank outlet 9. The outer surface of compensation tank 4 has step-like design on the side opposite compensation tank inlet 8 and compensation tank outlet 9, a fastening area 10 for fastening compensation tank 4 to the internal combustion engine being provided in each step. The housing of compensation tank 4 is made of a thermally conductive material, for example metal. The overall volume of the compensation tank is between 2 liters and 5 liters. The diameter ratio of compensation tank inlet 8 of the compensation tank to compensation tank outlet 9 is approximately 58/80. In one specific embodiment (not illustrated), the outer surface of compensation tank 4 between compensation tank inlet 8 and compensation tank outlet 9 only has one step, and compensation tank 4 essentially includes two compensation volumes that are connected with the aid of a fluidic bottleneck in the area of the step. This specific embodiment of compensation tank 4 has a volume of approximately 3 liters.

Figure 4:
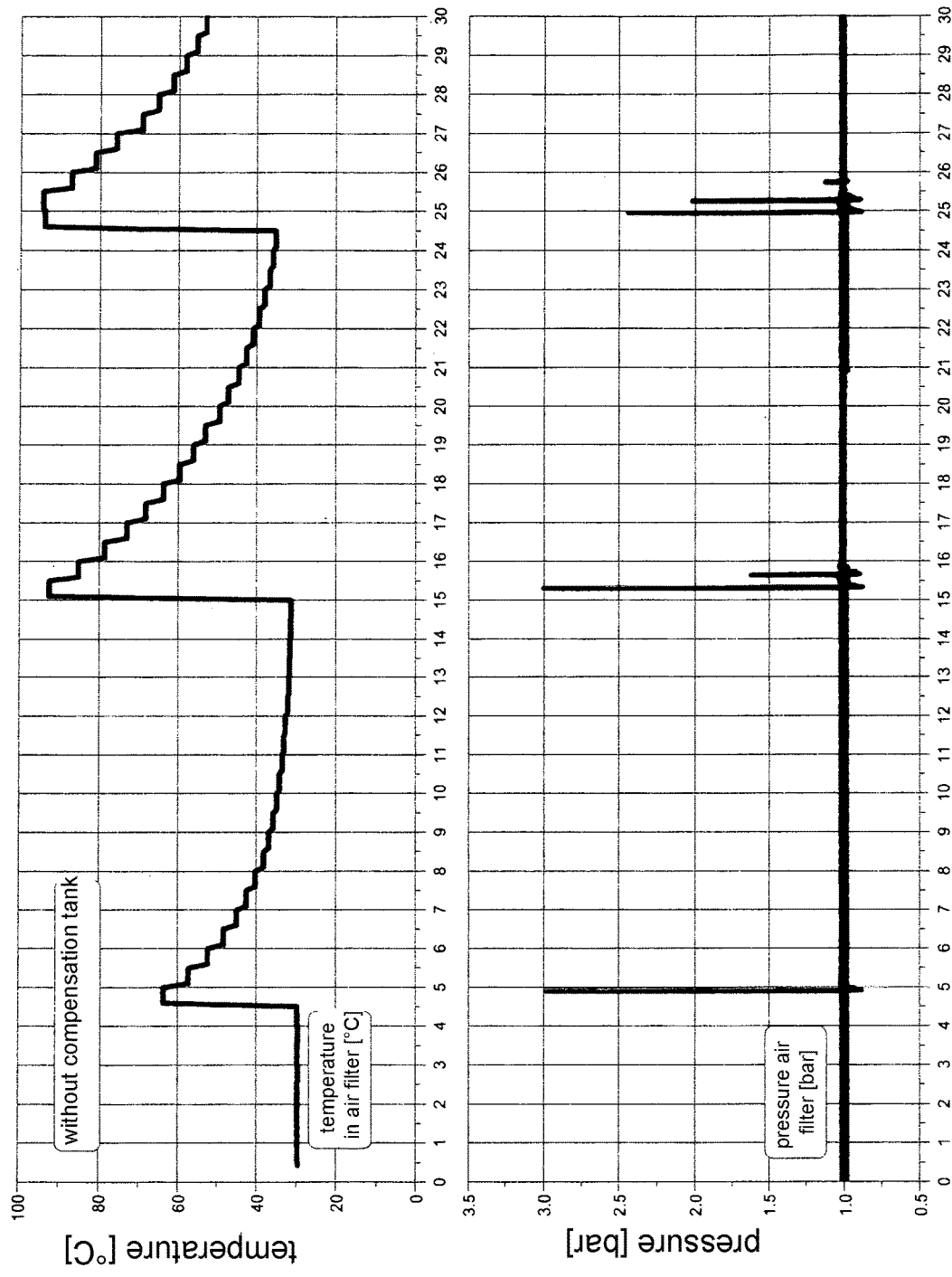
FIG. 4 shows temperature and pressure characteristics in the intake manifold without the compensation tank.

FIG. 4 shows the temperature and pressure characteristics in the intake manifold plotted over time without the compensation tank illustrated in FIG. 2.

Figure 5:
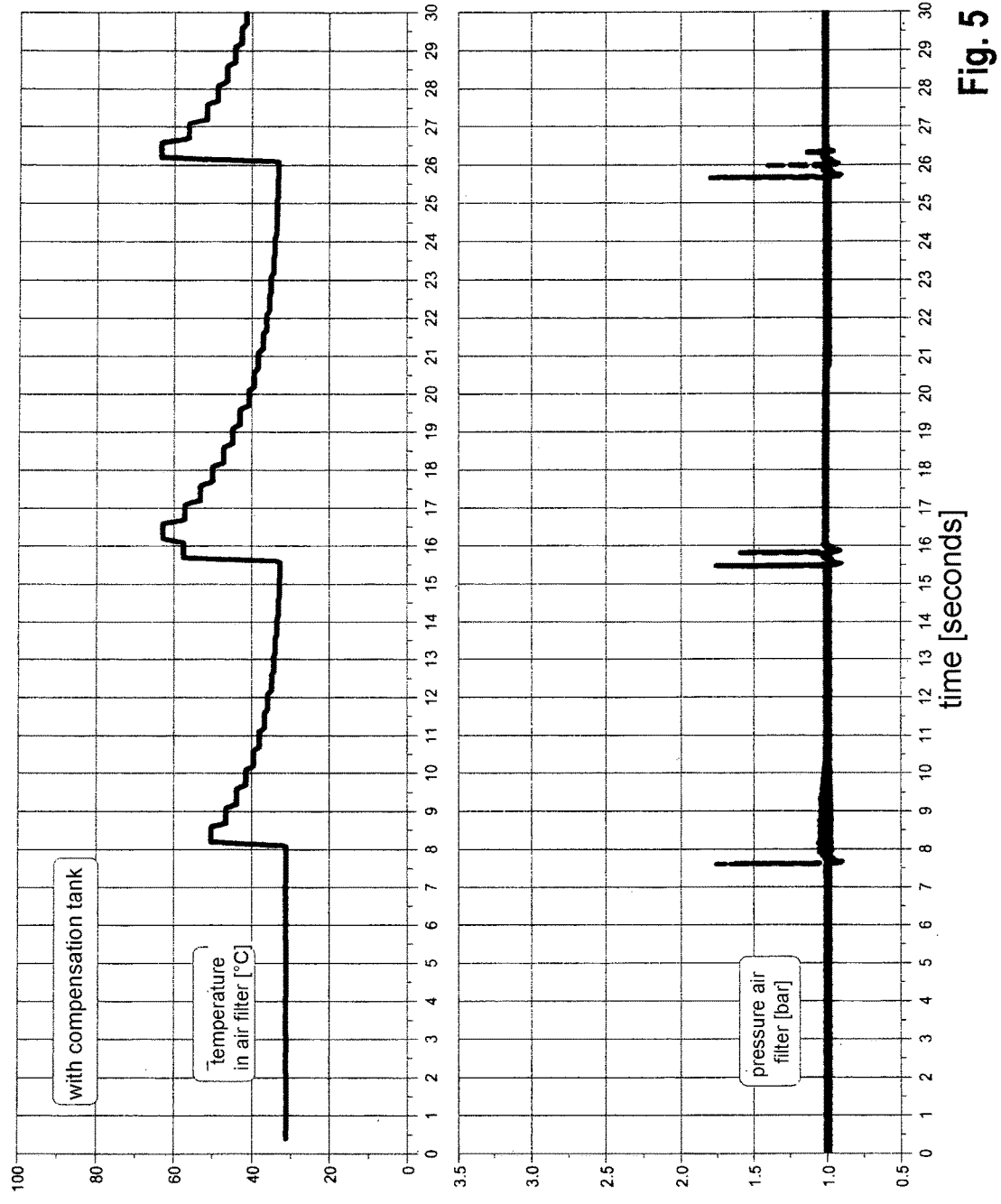
FIG. 5 shows temperature and pressure characteristics in the intake manifold including the compensation tank.

In FIG. 5, the temperature and pressure characteristics in the intake manifold including the compensation tank are illustrated over time on the internal combustion engine from FIG. 5. Here, it becomes apparent that the temperature as well as the pressure in the intake manifold are reduced when a compensation tank is used.

FIG. 6 shows a comparison in tabular form of the pressure and temperature values in the intake manifold of the same engine with and without a compensation tank.

LIST OF REFERENCE NUMERALS 1 throttle valve
2 carburetor/gas mixer/mixture forming device
3 flow rectifier
4 compensation tank
5 air filter
6 intake manifold
7 engine
8 compensation tank inlet
9 compensation tank outlet
10 fastening area

What is claimed is:

1. An internal combustion engine with external mixture formation comprising:
    an exhaust system; and
    an intake system, the intake system including an intake manifold, a throttle valve, a mixture forming device, a compensation tank and an air filter, the compensation tank being provided upstream from the throttle valve, the compensation tank forming an air volume upstream of the mixture forming device and downstream of the air filter and being configured for relieving a backfire pressure wave,
    wherein the compensation tank has a stepped design,
    wherein the stepped design defines a fluidic bottleneck between an inlet and an outlet of the compensation tank.

2. The internal combustion engine as recited in claim 1 wherein the throttle valve is situated between the intake manifold and the mixture forming device.

3. The internal combustion engine as recited in claim 1 wherein the mixture forming device is a gas mixer.

4. The internal combustion engine as recited in claim 1 wherein the mixture forming device is a carburetor.

5. The internal combustion engine as recited in claim 1 wherein the compensation tank is made of a thermally conductive material.

6. The internal combustion engine as recited in claim 1 wherein a ratio of an inlet of the compensation tank to an outlet of the compensation tank is approximately 58/80.

7. The internal combustion engine as recited in claim 1 wherein the mixture forming device and the compensation tank are connected via a flexible tube element.

8. The internal combustion engine as recited in claim 1 wherein a flow rectifier is situated between the compensation tank and the mixture forming device.

9. The internal combustion engine as recited in claim 1 wherein the flow rectifier is made of a metal mesh and/or a knitted metal and/or a comb-like extruded profile.

10. A method for operating the internal combustion engine as recited in claim 1 comprising:
    providing the compensation tank for receiving hot combustion gases in a backfire that are mixed with non-combustible fresh air in the compensation tank.

11. The internal combustion engine as in claim 1 wherein the fluidic bottleneck is defined by a first step on a first side of the compensation tank and a second step on a second side of the compensation tank that is opposite of the first side.

12. An internal combustion engine with external mixture formation comprising:
    an exhaust system; and an intake system, the intake system including an intake manifold, a throttle valve, a mixture forming device, a compensation tank and an air filter, the compensation tank including, on a first side thereof, a compensation tank inlet, a compensation tank outlet and at least one step on an outer surface of the compensation tank between the compensation tank inlet and the compensation tank outlet, wherein the compensation tank includes, on a second side opposite the first side, at least one further step on the outer surface of the compensation tank.

13. The internal combustion engine as recited in claim 12 wherein the compensation tank inlet has a larger diameter than the compensation tank outlet.

14. The internal combustion engine as recited in claim 12 wherein the compensation tank includes two compensation volumes connected by a fluidic bottleneck provided at the at least one step.

15. The internal combustion engine as recited in claim 12 wherein the compensation tank includes a fastening area fixed in the at least one step.

16. An internal combustion engine with external mixture formation comprising:

an exhaust system; and an intake system, the intake system including an intake manifold, a throttle valve, a mixture forming device, a compensation tank and an air filter, the compensation tank including, on a first side thereof, a compensation tank inlet, a compensation tank outlet and at least one step on an outer surface of the compensation tank between the compensation tank inlet and the compensation tank outlet, wherein the compensation tank includes a fastening area fixed in the at least one step.

* * * * *